Patented Sept. 6, 1949

2,481,294

UNITED STATES PATENT OFFICE 2,481,294

MANUFACTURE OF SOLUTIONS OF POLYVINYL DERIVATIVES

Paul Camille Elie Jacques Corbière and René Emile Fernand Stuchlik, Lyon, France, assignors to Societe Rhodiaceta, Paris, France No Drawing. Application June 24, 1947, Serial No. 756,802. In France June 21, 1941

Section 1, Public Law 690, August 8, 1946
Patent expires June 21, 1961

2 Claims. (Cl. 260—30.8)

The present invention relates to the manufacture of solutions of polyvinyl derivatives, particularly solutions of highly polymerized polyvinyl derivatives.

It is known that the solubility of polyvinyl derivatives in organic liquids diminishes in proportion as their macromolecular weight increases, so that great difficulties are encountered in obtaining technically satisfactory solutions of derivatives of high molecular weight. This applies more particularly in the case where the polymers concerned are entirely or partially formed of polyvinyl chloride. As is well known, the more highly polymerized substances are the more valuable from the point of view of technical use, and it is therefore of great importance to obtain solutions of these substances.

According to the present invention, it has been found that solutions of polymerized vinyl compounds can be very easily obtained by employing as solvent mixtures of two or more liquids of which one is carbon disulphide, and that this process is particularly applicable to polymers of high molecular weight composed entirely or partially of polyvinyl chloride.

This property of carbon disulphide is the more unexpected as it is not a solvent for these substances, either in the cold or at its boiling point, though it shows towards them a characteristic swelling action. It has indeed been found that not only does it improve the properties of the solutions obtained when mixed with certain solvents, but still more remarkably that it often enables excellent solutions to be obtained when mixed with another non-solvent.

The liquid or liquids utilized together with carbon disulphide may be already in themselves actual solvents for the polymers; in this case the presence of the carbon disulphide will improve the ease of solution or the homogeneity and clarity of the solutions obtained. They may also be latent solvents or swelling agents, or even non-solvents.

The liquids which may be used together with the carbon disulphide can belong to any of the three groups of organic compounds, namely aliphatic, carbo-cyclic or heterocyclic compounds. Amongst others there can be used representatives of the following types of compounds: hydrocarbons, halogenated hydrocarbons, nitro derivatives, alcohols, ketones, esters, formals, acetals, benzals and other reaction products resulting from the action of an aldehyde on an alcohol.

Examples of particularly useful substances are: methylene chloride, di-, tri- and tetrachlorethane, monochlorobenzene, tetrahydrofurfuryl alcohol, acetone, methyl-ethyl ketone, cyclopentanone, cyclohexanone, ethyl acetate, benzyl acetate, methyl salicylate, nitrobenzene, glycol-formal, dioxane, isophorone, triacetin and tetrahydrofurane. This list is given by way of example to show the great diversity of substances that can be used, and should not be considered as in any way limitative.

The mixtures of liquids used as the solvent can be binary or tertiary or can contain an even greater number of constituents according to the properties required of the solution to be obtained, particularly its viscosity and its speed of evaporation. The use of halogenated hydrocarbons presents the great advantage of reducing the inflammability of the vapours emitted by the solvent.

A particularly useful method of preparing solutions according to the present invention is to prepare them under pressure at a temperature higher than the boiling point of at least one of the liquids forming the solvent mixture. Such a solution can be made, for example, by heating in an autoclave either under the pressure naturally engendered by heating above the boiling point of one of the liquids, or with a further pressure applied by any means and particularly by the admission of compressed gases or vapours. According to the nature of solvent mixtures under consideration, it is possible to work at temperatures higher than the boiling point of one or several of the liquids forming the solvent mixture or above the boiling point of all the liquids.

In this manner solutions are very rapidly obtained which, depending upon their concentration, form more or less thick collodions, which may even attain the consistency of gels, but which have the property of being easily filtered and extruded from narrow orifices such as spinnerets or apertures for casting films.

The solutions obtained according to the invention can be utilized for the most varied purposes, either alone as such or with the addition of plasticisers, pigments, colouring matters, fillers and anti-delustrants. They are particularly indicated for obtaining lacquers and coating compositions, as well as films, foils, thin sheets, plates or objects obtained by casting or injection, and they are themselves particularly suitable for dry spinning or for wet spinning for the purpose of obtaining articles such as filaments, threads, fibres, ribbons, casings or straws which may be continuous or discontinuous, solid or hollow. The most important solutions obtained according to the invention are obviously those of such polymers as are insoluble in the usual solvents, but the invention is applicable to all the vinylic polymers whatever may be their content of halogen and their degree of polymerisation.

The present invention is illustrated by the following non-limitative examples.

*Example 1*

A polymer of vinyl chloride is used of which the solubility in acetone is insufficient even at 50° C. to obtain a homogeneous solution of a concentration of 1 part of the substance in 10 parts of solvent.

100 g. of this polyvinyl chloride, 500 cc. of carbon disulphide and 500 cc. of acetone are introduced into a flask. After several minutes agitation at ordinary temperature a homogeneous solution is obtained of only slightly turbid appearance, which is comparatively fluid and which gives by casting on an evaporative surface a transparent film capable of being stretched in the cold without solvent and possessing excellent strength, extensibility and flexibilty. Analogous results are obtained giving nearly the same viscosity with mixtures having 30–70 parts by volume of acetone to 70–30 parts by volume of carbon disulphide.

*Example 2*

There is used a polymer similar to that of Example 1 and of which the molecular weight as measured by the determination of the specific viscosity of a solution of 2 parts per 1000 in dioxane is 32,700.

This substance forms in hot cyclohexanone a milky solution which is immediately clarified by the addition of a quantity of carbon disulphide equal to 10% or more of the volume of the cyclohexanone. This solution is particularly suited for lacquers and coatings requiring slow drying.

*Example 3*

120 g. of the polymer mentioned in Example 1 are introduced into 1000 cc. of a mixture of equal volumes of carbon disulphide, acetone and methylene chloride, and are agitated. A collodion is rapidly obtained at ordinary temperature which is suitable for dry spinning to produce valuable threads.

*Example 4*

A mixed polymer of vinyl chloride and acetate (87% of vinyl chloride), giving at 90° C. a 25% solution in tetrachlorethane, which gelatinises on cooling, is triturated for 30 minutes with its own weight of carbon disulphide. 2 parts by weight of tetrachlorethane are then added and the mixture thoroughly kneaded. A solution is obtained which is stable in the cold.

*Example 5*

100 g. of the same polymer as that used in Example 4 are saturated with carbon disulphide vapour, then kneaded at ordinary temperature with 4 times its weight of acetone. A solution is obtained more rapidly and more satisfactorily than when the polymer is not treated with the carbon disulphide vapour.

*Example 6*

100 g. of the polymer of Example 1 are introduced into 1000 cc. of a mixture formed of 8 parts by volume of tetrahydrofurfuryl alcohol and 2 parts by volume of carbon disulphide. After kneading in a closed vessel while raising the temperature to 50–60° C., an extremely limpid solution is obtained which is suitable for wet spinning.

*Example 7*

Into an autoclave furnished with stirring gear there is introduced 2.500 kg. of the polymer of Example 1 and 7.500 kg. of a mixture comprising:

|  | Volumes |
|---|---|
| Carbon disulphide | 50 |
| Acetone | 45 |
| Cyclohexanone | 5 |

After closing the autoclave its contents are stirred while the temperature is raised to 70° C. After mixing for 3 hours and cooling, there is obtained a very viscous collodion, easily filtered and suitable for dry spinning.

*Example 8*

Into an autoclave with a stirring gear there is introduced 1.500 kg. of the same polymer as that described in Example 1 and 8.500 kg. of a cooled mixture consisting of equal parts of carbon disulphide and ethylene oxide.

After closing the autoclave the contents are stirred while allowing the temperature to rise to 25–30° C., that is to say a temperature intermediate between the boiling point of ethylene oxide (10° C.) and that of carbon disulphide (41° C.). After stirring for 2 hours a very homogeneous collodion is obtained which is very suitable for spinning or for casting films.

What we claim and desire to secure by Letters Patent is:

1. Solutions of acetone-insoluble polyvinylchloride in a mixture of carbon disulfide and acetone containing at least 30% and not more than 70% of carbon disulfide.

2. Solutions of acetone-insoluble polyvinylchloride in a mixture containing 50% carbon disulfide and 50% acetone.

PAUL CAMILLE ELIE
JACQUES CORBIÈRE.
RENÉ EMILE FERNAND STUCHLIK.

REFERENCES CITED

The following references are of record in the file of this patent:

UNITED STATES PATENTS

| Number | Name | Date |
|---|---|---|
| 2,198,794 | Smith | Apr. 30, 1940 |